Feb. 18, 1958     A. MORA     2,823,468
PAPER HOLDER AND STYLUS FOR PRODUCING RAISED
CHARACTERS OF THE BRAILLE SYSTEM
Filed Nov. 23, 1954
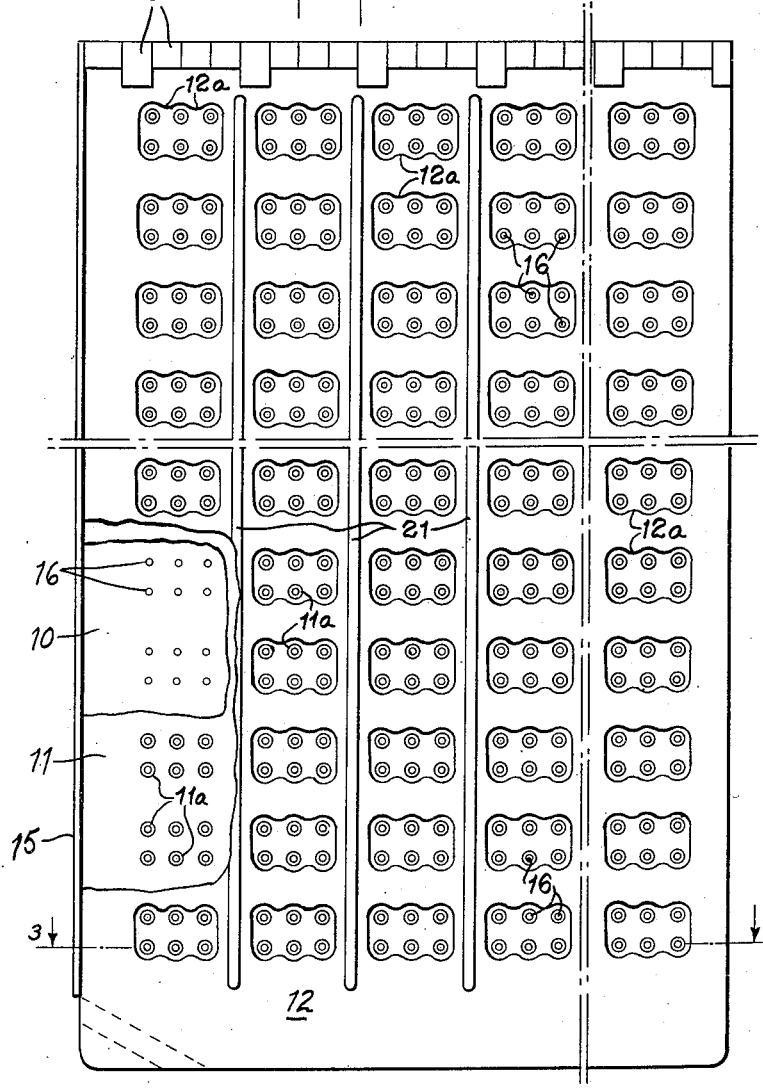
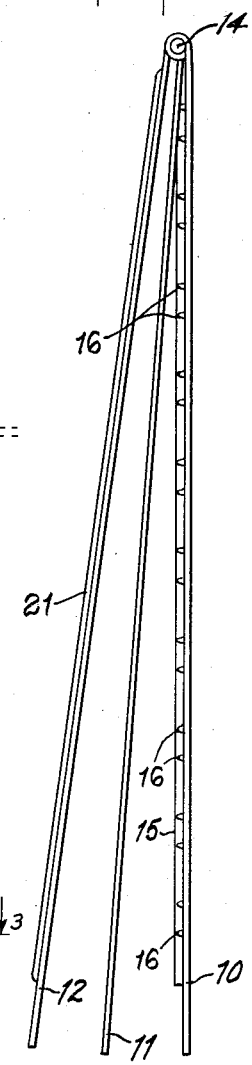
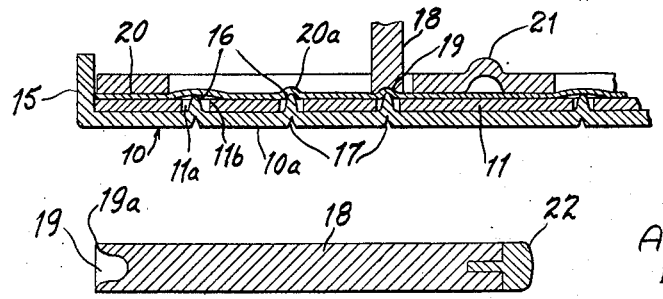
INVENTOR.
ANTONIO MORA
BY Joseph F. O'Brien
ATTORNEY United States Patent Office 2,823,468
Patented Feb. 18, 1958

2,823,468

PAPER HOLDER AND STYLUS FOR PRODUCING RAISED CHARACTERS OF THE BRAILLE SYSTEM

Antonio Mora, New York, N. Y.

Application November 23, 1954, Serial No. 470,664

3 Claims. (Cl. 35—38)

This invention relates to paper holder and stylus for producing raised characters of the Braille system of dots by blind persons.

One of the objects of this invention is to provide a paper holder having means for embossing by the use of pointed elements arranged in the paper holder cooperating with a stylus in the hands of a blind person, the Braille alphabet and numeral dots in the conventional Braille series of six dots in each series and to cause such alphabet or numeral dots to project upwardly from the upper surface of a sheet of paper in relief or in raised condition, and thus to enable the upward embossing by blind persons of Braille letters or characters which are readable from the left to right.

Another object of this invention is to provide a paper holder which will enable a blind person to readily select and produce in a sheet of paper which may be in the form of a letter written or embossed in Braille characters.

Another object of my invention is to provide a holder that embodies a plurality of hinged plates comprising (1) a bottom plate provided with a multiplicity of upwardly-projecting dot-embossing points or elements arranged in the conventional Braille-system of six dots in a series; (2) a bed plate comprising an intermediate paper-mounting and release plate provided with an individual or independent hole for each embossing point through which said point extends and with surface portions between each hole and point, and each of which holes loosely fits over and encloses an embossing point, each hole being preferably surrounded by an edge depression to assist in positioning and centering the embossing stylus, and (3) an upper stylus-guiding and cover plate having group apertures arranged over a series of six points for the touch-guiding of a stylus having a hollow into engagement with the dot producing points in the bed plate.

Still another object of this invention is to provide a paper holding structure of the type specified by the use of which Braille characters, if mistakenly formed, may be readily obliterated by a mere lifting of the bed plate from the points and a smoothing of the dots to rub out of the formed Braille characters by a blunt end of the stylus or like blunt element.

Still another object of this invention is to provide the upper surface of the stylus-guiding and cover plate with additional guiding means or ribs arranged between pairs of points which are arranged in a Braille series so as to separate a Braille series of six dots into pairs of dots and thus to permit feeling or touching of a pair of points as well as an entire series, and thus to assist in guiding a stylus into contact with the individual points in a six-point Braille series thereof.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a view in plan of my improved paper holder comprising a series of hinged plates and embodying means for readily producing by a suitable stylus embossed or raised dots positioned in accordance with the Braille system;

Fig. 2 is an end elevation of the holder shown in Fig. 1 with the hinged plates or leaves slightly separated;

Fig. 3 is a section on the line 3—3 of Fig. 1, looking in the direction of the arrows; and Fig. 4 is a view in longitudinal section of a stylus having at one end means for producing the Braille dots in cooperation with my paper holder and also means for obliterating the dots when a mistake is made.

Referring now to these drawings which illustrate a preferred embodiment of my invention, my paper holder embodies a plurality and preferably three plates of any suitable material and which may be composed of sheet metal, plastic or other similar sheet material, and said holder comprises a point-embodying bottom plate 10, a bed plate for the paper to be embossed comprising an intermediate paper-mounting and release plate 11 and an upper stylus-guiding plate 12. These plates are preferably of a length and width which conform to the size of a sheet of writing paper to be embossed and said three plates are suitably hinged together at one edge, and preferably the top edge thereof, by providing each of the various plates with suitable eyes 13 and passing therethrough a hinged pintle 14.

As illustrated, the bottom plate 10 is preferably provided at one side edge with an edge rib or paper-aligning member 15 and the entire upper surface of the said bottom plate 10 is provided with groups of upwardly-projecting points 16 arranged in a multiplicity of six-point series or groups similar to the six-dot series of the conventional Braille system, said groups or series of points being arranged in aligned transverse rows and also in aligned longitudinal columns.

In the preferred embodiment of my invention, these series of points 16 are preferably formed integrally in the plate 10 and when the plate is formed of a ductile material, the points may be formed therein by stamping the same upwardly from the bottom 10ᵃ of the plate 10 as shown at 17. In such a bottom plate, the points 16, whether stamped up or otherwise produced, will be sharp, and arranged in said six-point series or groups corresponding to the conventional embossed dots in the Braille system. These points, however, will be sharp and the plate provided therewith will, as hereinafter stated, in cooperation with the other elements of my invention, form a holder mechanism or machine which is capable of producing in each series or group, an alphabetic or number character of the Braille system.

In accordance with the preferred form of my invention, the sections or portions of the bottom plate between the points thereon and between the series or groups of points are covered by the bed plate and each of the embossing points in each series or group is enclosed by the edges of one of the holes which loosely fits over and encloses such embossing point. The surrounding edge of each of these holes is preferably depressed below the upper surface of the intermediate paper-mounting bed plate and the points extend through such depressions but only slightly above the said upper surface of the plate, so that such upper surface of said intermediate bed plate will enable the sliding thereover of a sheet of paper for the purpose of aligning the same by engagement of the edges thereof with the hinged members 13 and the edging element 15.

The upper plate 12 comprises a stylus-guiding and paper-covering plate and has in its surface stylus-guiding apertures so arranged as to enable the touch-guiding of a stylus 18 into engagement with each of the groups or series of points projecting through the bed plate and with the dot-producing points in the several groups passing through the bed plate.

Such stylus is provided at one end with a hollow cup-shaped dot-producing element 19 having at one end the stylus 18 which is adapted, when pressed downwardly through a guiding aperture in the upper plate 12 and against the top surface of a sheet of paper 20, which in the preferred embodiment of my invention is arranged above the intermediate bed plate 11 and by pressing downwardly of the cup-shaped stylus on the points projecting through such intermediate bed plate, to cause the rim or edge 19a of said cup-shaped member to enter the depressions and thus form a raised dot 20 in the surface of the paper. While it is desirable to provide a cup-shaped stylus as hereinabove stated, a somewhat similar result may be obtained by pressing the rubber of a pencil down over a point.

Said intermediate bed plate preferably thus provides a surface over which the paper 20 may be slid into suitably aligned position for the purpose of forming the dots 20.

The upper plate 12 is preferably provided with apertures arranged in a multiplicity of series or groups covering six isolated points, each series of six apertures being isolated from the other, and also each series of apertures is preferably subdivided by portions 12a of the top plate into pairs of sectional apertures fitting over pairs of dots so that each series of apertures will be similar to six Braille dots and will comprise three pairs of such sectional apertures without affecting the isolation of each of the series from the other. Thus, the apertures may be more readily located and selected by a blind person through touching thereof by the fingers to locate the proper dot or dots in a series to produce a Braille character and then to press the stylus through that aperture or apertures and into contact with the paper, which in turn is pressed against that portion of the intermediate plate surrounding a point or hole. The edges of the stylus are depressed over the point as aforesaid, thus guiding the edges 19a of the cup-shaped hollow end 19 of the stylus 18 around a point to make a dot. Such pressure by the cup of the stylus will thus enable the formation of a Braille character comprising a letter or number at each isolated group or series of points and will thus enable a blind person to spell out or write a letter composed of such Braille dots in the paper 20.

The upper plate member is also preferably provided with a series of longitudinally-disposed rib portions 21 which are arranged between the several isolated series of dots. These ribs will assist a blind person in guiding the stylus 18 or a pointed soft rubber into position over any particular series of projecting points or dot-producing pins.

In the preferred embodiment of my invention, the stylus has at one end the cup-shaped hollow terminal 19 and at the other end is provided with a blunt metallic element 22 which is adapted, when a mistake is made, to smooth out the dots for the purpose of rubbing out or obliterating the same from the letter being prepared by the blind person.

In a modified form of my invention the point-embodying bottom plate 10 may be provided with aligning projections such as 15 and the intermediate and upper plates may be provided with elongated slots or sockets adapted to fit over these projections 15 for the purpose of more thoroughly aligning the upper and intermediate plates with the bottom plate.

Having described my invention, I claim:

1. A paper holder for embossing Braille dots in the upper surface of a sheet of paper comprising a paper holder composed of a relatively stationary base plate of sheet material having a width and length similar to a conventional sheet of paper and adapted to support and fit beneath such conventional sheet of paper, said base plate having upwardly projecting points of pins arranged in a multiplicity of aligned series disposed in accordance with the conventional Braille system of six dots in a series, means arranged in combination with said bottom plate to permit a blind person to guide into contact with one or more of each of such a series of points so arranged in accordance with the Braille system, an instrument adapted to enable production in the paper of upwardly-embossed Braille characters by the use of said instrument comprising, a top plate provided with apertures fitting over the points and adapted to guide the movement of the instrument over a given pin in each series of dots so as to enable the embossing of such dots in the paper by a blind person, said upper stylus guiding plate being provided with a series of longitudinal ribs adapted to guide a dot-embossing instrument during a touching of the points in a series of such points so arranged in accordance with the Braille system.

2. A paper holder for embossing Braille dots in the upper surface of a sheet of paper comprising a paper holder composed of a relatively stationary base plate of sheet material, said base plate having a multiplicity of upwardly projecting pointed pins disposed in a series of separate transverse rows arranged in alignment with each other, each row embodying a series of groups arranged according to the conventional Braille system of six dots in a group, and a top paper-holding plate engaging the upper surface of said paper and having a multiplicity of apertures corresponding to and loosely fitting over each of the various pointed pins of the base plate.

3. A paper holder for embossing Braille dots in the upper surface of a sheet of paper comprising a paper holder composed of a relatively stationary base plate of sheet material having a width and length similar to a conventional sheet of paper and adapted to support and fit beneath such conventional sheet of paper, said base plate having a multiplicity of upwardly-projecting pointed pins disposed in a series of separate transverse rows arranged in alignment with each other, each embodying a series of groups arranged according to the conventional Braille system of six dots in a group, an intermediate plate provided with apertures adapted to independently fit over each of the various pointed pins of the base plate and to form a bed plate on which a sheet of paper may be laid, a stylus having a hollow portion adapted to fit over one of said pins, and a top plate provided with apertures arranged in series to fit over a plurality of said points and adapted to guide the movement of said stylus to and over a given pin in each Braille group of pins, said upper stylus-guiding plate being provided with a series of longitudinal ribs adapted to guide said stylus during a touching of the points in a series of such points arranged in accordance with the Braille system.

References Cited in the file of this patent
UNITED STATES PATENTS

| | | |
|---|---|---|
| 1,175,951 | Greene | Mar. 21, 1916 |
| 1,936,783 | Chase | Nov. 28, 1933 |
| 2,190,752 | Brown | Feb. 20, 1940 |